March 28, 1967     H. W. KINANDER     3,311,133
FLEXIBLE CONDUIT
Filed Jan. 22, 1964
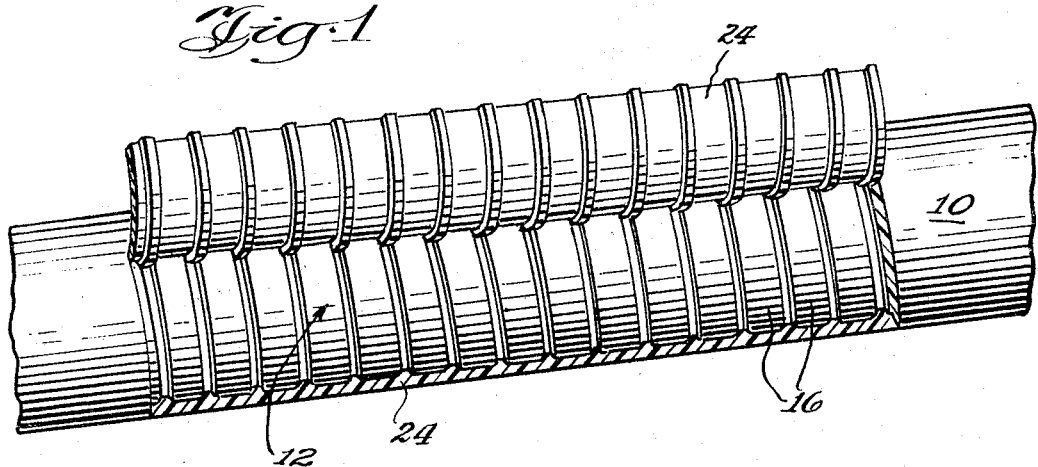
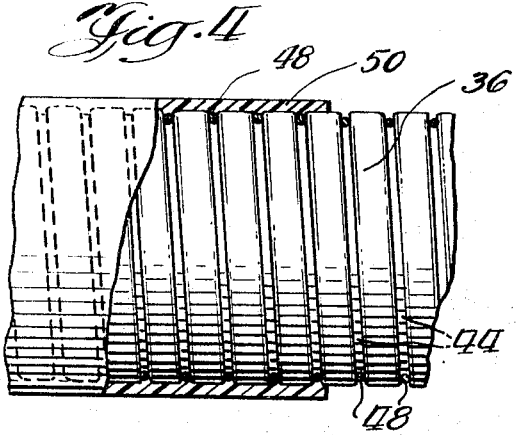
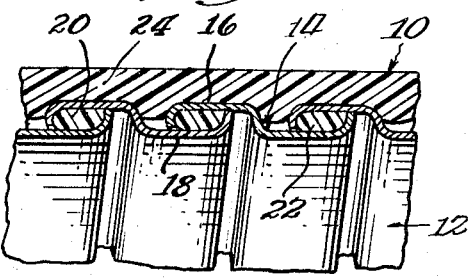
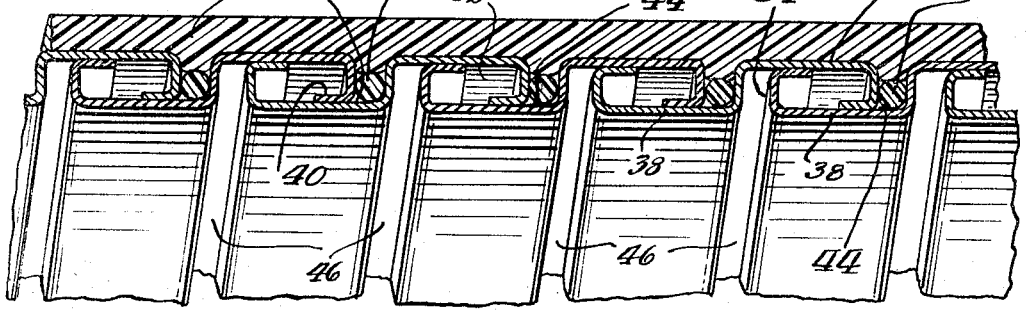
Inventor
Harold W. Kinander
By Dressler, Goldsmith, Clement, Gordon & Ladd
Attorneys

United States Patent Office 3,311,133
Patented Mar. 28, 1967

3,311,133
FLEXIBLE CONDUIT
Harold W. Kinander, Roselle, Ill., assignor to
Electri-Flex Company
Filed Jan. 22, 1964, Ser. No. 339,449
8 Claims. (Cl. 138—136)

This invention relates to a flexible metal conduit and, more particularly, to a flexible metal conduit of the strip-wound type having convolutions which are axially movable with respect to each other, and having a seamless jacket of flexible material.

Flexible metal hose of the strip-wound type has been known for many years. Such hose is made by winding a metal strip about a mandrel and folding the strip longitudinally so that the edge portions of each convolution of the strip overlap and interlock with folded edge portions of the preceeding and succeeding convolutions. There is a limited amount of freedom of axial movement in each interlock so that the hose may be axially extended from a position of minimum length in which succeeding convolutions are in contact with each other to a position of maximum length in which the convolutions are prevented from further separation by the interlocks. The ability of the convolutions to move axially provide flexibility to the hose permitting opening of the convolutions on the convex side of a bend in the hose and closing of the convolutions on the concave side.

Flexible metal hose of the foregoing type has been jacketed with flexible plastic material to provide protection against moisture leakage and against abrasion of the metal. For additional protection against moisture penetration, a cotton twine may be spirally wound within the enclosed channel formed by the overlapping convolutions. Prior to this invention several types of jacketed flexible hose assemblies have been available.

In one type of assembly, the seamless plastic jacket is applied while the convolutions are spaced apart by a substantial displacement and the plastic material penetrates and substantially fills the grooves between the convolutions, forming corresponding ridges of substantial width on the inner surface of the jacket.

In another type of prior jacketed hose assembly, the seamless plastic jacket is applied while the convolutions are completely closed and in contact with each other. In such assemblies there are no grooves of any significance between adjacent convolutions and there is no plastic flow between convolutions. The plastic jacket is smooth on both its inner and outer surfaces.

In my co-pending application S.N. 316,747 filed Oct. 16, 1963, there is disclosed a novel jacketed strip-wound flexible metal hose and a method of making the same. The flexible metal hose of my co-pending application includes a convoluted metal strip wherein the convolutions are properly spaced in order to obtain the advantages and alleviate the disadvantages of the prior art hose assemblies.

In one embodiment of the jacketed strip-wound flexible metal hose of my co-pending application an oversized cotton twine is employed as a spacing means and is disposed within the convolutions of the metal hose. Although a cotton twine may be soft, it can only be compressed to a point wherein the air between the threads is expelled and the threads are in an intimate contact with one another, and thus flexibility of the hose assembly is dampened. Furthermore, if a portion of the cotton twine is exposed to moisture, the water impervious properties of the arrangement are reduced due to the tendency of cotton to act as a wick, carrying moisture along its length by capillarity.

In another form of the invention disclosed in my co-pending application a continuous copper wire serves as a spacer and is disposed within the convolutions. Although a copper wire is hydrophobic in character, its resilience is practically negligible and its use as a spacer between the convolutions of a metal hose impairs flexibility of the hose.

In the present invention an elastomeric strand is provided in a flexible metal conduit which comprises a spiroid formed of a continuous metal strip having a generally S-shaped cross-sectional configuration. Although there are numerous types of spiroids formed of continuous metal strips that could be employed, in a preferred embodiment of the invention, a metal hose such as the type disclosed in my co-pending application is used.

The convolutions of the spiroid are spirally interlocking with a portion of each of the upper nodes of the S communicating with a portion of each of the adjacent lower nodes of the S. A continuous generally rubbery or elastomeric strand is parallelly disposed with respect to the convolutions and is located therein. The spiroid is tightly surrounded with a seamless, generally resilient material to provide an impervious coating. The elastomeric strand employed in the present invention has hydrophobic properties and hence, enhances the water impermeability of the arrangement. Additionally, the flexibility of the metal hose of the present invention is increased due to the elastomeric properties of the strand. An elastomeric strand has a type of resilience wherein a large amount of pressure against the strand can cause substantially total compression. Materials such as natural and synthetic rubbers and preferably polyvinyl chloride are suitable elastomeric materials for the elastomeric strand.

The convolutions of the spiroid interlock forming a continuous enclosed channel and two continuous furrows, the first of the furrows communicating with the outside of the spiroid and the second communicating with the inside. In one form of the invention the elastomeric strand is located within the continuous channel in order to properly space the convolutions. In another form of the invention the elastomeric strand is located within the first furrow.

To prevent axial movement of the spiroid with respect to the surrounding material a resilient jacket material which partially fills the outer interstices of the spiroid is provided in one embodiment of the invention.

A more detailed explanation of the invention is provided in the following description and claims and illustrated in the accompanying drawing which discloses by way of examples the principles of the invention and the best mode contemplated of applying those principles.

In the drawing:

FIGURE 1 is a view on an enlarged scale of the jacketed flexible metal conduit of this invention with a portion of the jacket cut and peeled back to illustrate its undersurface;

FIGURE 2 is an enlarged fragmentary cross-sectional view of the jacketed convolutions of one embodiment of the invention;

FIGURE 3 is an enlarged fragmentary cross-sectional view of the jacketed convolutions of a second embodiment of the invention; and, FIGURE 4 is a side elevation partially in cross-section showing the overall construction of the jacketed flexible metal conduit of FIGURE 3.

Referring to FIGURES 1 and 2, a jacketed metal conduit designated generally as 10 is shown which comprises a spiroid 12 which is formed of a generally S-shaped continuous metal strip 14. Metal strip 14 comprising upper node 16 and lower node 18 is spirally wound so that the convolutions of the spiroid 12 are interlocking with at least a portion of upper node 16 communicating with a portion of lower node 18 of the adjacent convolution. In this manner a continuous enclosed channel 20 is formed within the convolutions.

By placing an elastomeric strand 22 within the channel 20 many advantages are thereby secured. As shown in FIGURE 2, the elastomeric strand 20 is compressed by the upper and lower nodes of adjacent convolutions. The flattened elastomeric strand controls the desired spacing between the convolutions, yet provides an amount of flexibility which could not be achieved by utilizing a less resilient spacer.

To imperviously seal the metal conduit a seamless jacket 24 formed of a generally resilient material is provided to tightly surround spiroid 12. In one embodiment of the invention, the resilient material partially fills the outer interstices of the convolutions as most clearly shown in FIGURE 2 to prevent axial movement of the spiroid 12 with respect to outer jacket 24. Elastomeric strand 22 spaces the convolutions so that the flow of resilient outer material inward to fill the spaces between convolutions is not great enough to cause unsightly grooves or wrinkles. Additionally, the conduit is expansible and compressible, since the internal ridges of the outer jacket are relatively narrow and not substantial enough to provide too much resistance to compression. The flexibility of the conduit is enhanced due to the compressibility of elastomeric strand 22 within cavity 20.

In a preferred embodiment of the invention the resilient jacket material and the elastomeric strand consists of a material such as a vinyl chloride homopolymer. In a specific example Geon plastic 8620, made by the B. F. Goodrich Chemical Company has been found quite satisfactory. This plasticized polyvinyl chloride has a specific gravity of 1.39 and a Durometer hardness of 79 (A scale). In addition to its flexibility, the material has excellent electrical insulation and waterproof properties.

The great compressibility of an elastomeric strand effectively increases the flexibility of the conduit. Additionally, an elastomeric strand is hydrophobic and hence more effective for moisture protection due to its avoidance of a wicking effect.

In the embodiment shown in FIGURES 3 and 4, the generally S-shaped metal strip 34 consists of upper node 36 and lower node 38 with the convolutions bent at their ends to provide an overhang 40 in both directions. This embodiment is particularly suitable for larger diameter conduit. By spirally winding the metal strips so that the convolutions interlock with a portion of each of the upper node 36 communicating with a portion of each of the adjacent lower nodes 38, a continuous enclosed channel 42 is formed in addition to two continuous furrows 44 and 46. The first furrow 44 communicates with the outside of the spiroid and the second furrow 46 communicates with the inside.

A continuous generally elastomeric strand 48 is wound so that it is positioned within the first furrow 44. A seamless generally resilient material 50 surrounds the spiroid and partially fills the first continuous furrow 44. The resilient material of outer jacket 50 and of strand 48 could be a material such as discussed with respect to FIGURES 1 and 2. By using such a material not only does this embodiment have great flexibility but its waterproof properties are excellent. Additionally, not only does strand 48 provide an effective spacing means, but the strand also controls the amount of material 50 that can enter furrow 44. Due to the elastomeric properties of material 48 any expansion or bending of the conduit will cause a compression of strand 48 and thereby provide an even greater seal to prevent leakage.

In a specific embodiment, the conduit of FIGURE 2 comprises a metal strip of about 0.356 inch width which may be bent to a generally S-shape and wound to form a spiroid having about a ¾ inch diameter. A suitable range for the diameter of the strand is from approximately 0.04 inch to about 0.10 inch in its uncompressed state.

In some applications where a continuous conducting strand is required copper wire coated with an elastomeric material could be provided as a substitute for strand 48. It is apparent that the flexibility of the assembly will partially depend on the thickness of the plastic coating around the copper strand.

Conduit assemblies made in accordance with the invention provide flexibility by permitting both expansion and contraction of the convolutions on both sides since the maximum possible displacement between convolutions is only partially taken up and since the spaces between adjacent convolutions are only partially filled with resilient material. By the use of the elastomeric strand the convolutions are properly spaced, are flexible in all directions and the water impermeable properties of the assembly are enhanced. The jacket is axially locked to the metal conduit by the internal ridges in the resilient jacket which are formed in the external furrow of the spiroid.

Although the invention has been described in relation to its preferred embodiments, in which the elastomeric strand has a spacing function, it is to be understood that the invention includes the use of an elastomeric strand in other embodiments wherein moisture sealing is substantially the sole function.

Although the fundamental novel features of the invention as applied to preferred embodiments have been shown and described it will be understood that various omissions and substitutions and changes in the detail and form of the device illustrated may be made by those skilled in the art without departing from the spirit of the invention.

What is claimed is:

1. A flexible metal conduit having an outer impervious coating which comprises: a spiroid formed of a continuous metal strip having a generally S-shaped cross-sectional configuration, the convolutions of said spiroid being spirally interlocking with a portion of each of the upper nodes of the S communicating with a portion of each of the adjacent lower nodes of the S; a continuous generally elastomeric strand parallelly disposed with respect to said convolutions and located therein; and a seamless generally resilient material tightly surrounding said spiroid to provide an impervious coating.

2. A flexible metal conduit having an outer imprevious coating which comprises: a spiroid formed of a continuous metal strip having a generally S-shaped cross-sectional configuration, the convolutions of said spiroid being spirally interlocking with a portion of each of the upper nodes of the S communicating with a portion of each of the adjacent lower nodes of the S; a continuous generally elastomeric strand parallelly disposed with respect to said convolutions and located therein whereby said convolutions are properly spaced by said elastomeric strand and the flexibility of the conduit is enhanced; and a seamless generally resilient material tightly surrounding said spiroid to provide an impervious coating and partially filling the outer interstices thereof to prevent axial movement of said spiroid with respect to said surrounding material.

3. A flexible metal conduit having an outer impervious coating which comprises: a spiroid formed of a continuous metal strip having a generally S-shaped cross-sectional configuration, the convolutions of said spiroid being spirally interlocking with a portion of each of the upper nodes of the S communicating with a portion of each of the adjacent lower nodes of the S; a continuous polyvinyl chloride strand parallelly disposed with respect to said convolutions and located therein whereby said convolutions are properly spaced by said strand and the flexibility of the conduit is enhanced; and a seamless generally resilient material tightly surrounding said spiroid to provide an impervious coating and partially filling the outer interstices thereof to prevent axial movement of said spiroid with respect to said surrounding material.

4. A flexible metal conduit having an outer impervious coating which comprises: a spiroid formed of a continuous metal strip having a generally S-shaped cross-sectional configuration, the convolutions of said spiroid being spirally interlocking with a portion of each of the upper nodes of the S communicating with a portion of each of the adjacent lower nodes of the S thereby forming a continuous enclosed channel; a continuous polyvinyl chloride strand having a diameter between about 0.04 inch and 0.10 inch parallelly disposed with respect to said convolutions and located within said continuous channel; and a seamless generally resilient material tightly surrounding said spiroid and partially filling the outer interstices thereof to prevent axial movement of said spiroid with respect to said surrounding material.

5. A flexible metal conduit having an outer impervious coating which comprises: a spiroid formed of a continuous metal strip having a generally S-shaped cross-sectional configuration, the convolutions of said spiroid being spirally interlocking with a portion of each of the upper nodes of the S communicating with a portion of each of the adjacent lower nodes of the S thereby forming a continuous enclosed channel and two continuous furrows, a first of said furrows communicating with the outside of said spiroid and a second of said furrows communicating with the inside of said spiroid; a seamless generally resilient material tightly surrounding said spiroid; and a continuous generally elastomeric strand parallelly disposed with respect to said convolutions and located within said first furrow.

6. A flexible metal conduit having an outer impervious coating which comprises: a spiroid formed of a continuous metal strip having a generally S-shaped cross-sectional configuration, the convolutions of said spiroid being spirally interlocking with a portion of each of the upper nodes of the S communicating with a portion of each of the adjacent lower nodes of the S thereby forming a continuous enclosed channel and two continuous furrows, a first of said furrows communicating with the outside of said spiroid and a second of said furrows communicating with the inside of said spiroid; a seamless generally resilient material tightly surrounding said spiroid and partially filling said first furrow; and, a continuous generally elastomeric strand parallelly disposed with respect to said convolutions and located within said first furrow.

7. A flexible metal conduit having an outer impervious coating which comprises: a spiroid formed of a continuous metal strip having a generally S-shaped cross-sectional configuration, the convolutions of said spiroid being spirally interlocking with a portion of each of the upper nodes of the S communicating with a portion of each of the adjacent lower nodes of the S thereby forming a continuous enclosed channel and two continuous furrows, a first of said furrows communicating with the outside of said spiroid and a second of said furrows communicating with the inside of said spiroid; a seamless generally resilient material tightly surrounding said spiroid; and a continuous polyvinyl chloride strand parallelly disposed with respect to said convolutions and located within said first furrow.

8. A flexible metal conduit having an outer impervious coating which comprises: a spiroid formed of a continuous metal strip having a generally S-shaped cross-sectional configuration, the convolutions of said spiroid being spirally interlocking with a portion of each of the upper nodes of the S communicating with a portion of each of the adjacent lower nodes of the S thereby forming a continuous enclosed channel and two continuous furrows, a first of said furrows communicating with the outside of said spiroid and a second of said furrows communicating with the inside of said spiroid; a seamless generally resilient material tightly surrounding said spiroid and partially filling said first furrow; and a continuous polyvinyl chloride strand having a diameter between about 0.04 inch and about 0.10 inch parallelly disposed with respect to said convolutions and located within said first furrow.

References Cited by the Examiner

UNITED STATES PATENTS

| | | | |
|---|---|---|---|
| 330,910 | 11/1885 | Levavasseur | 138—136 |
| 1,095,648 | 5/1914 | Lutz | 138—131 |
| 1,977,219 | 12/1932 | Williams | 138—139 X |
| 2,045,540 | 6/1936 | Debendetti | 138—135 X |
| 2,145,182 | 1/1939 | Kirch | 138—136 X |
| 2,897,253 | 7/1959 | Davey et al. | 138—135 X |
| 3,073,351 | 1/1963 | Nichols | 138—135 X |

LAVERNE D. GEIGER, *Primary Examiner.*

H. S. BELL, *Assistant Examiner.*